United States Patent

Beck et al.

[11] 4,146,587
[45] Mar. 27, 1979

[54] SEGMENT POLYMERS DERIVED FROM AROMATIC VINYL-DIENE BLOCK POLYMER ANION AND AROMATIC POLYCARBONATE

[75] Inventors: Manfred Beck, Odenthal; Jochen Schnetger, Odenthal-Hoeffe, both of Fed. Rep. of Germany

[73] Assignee: Bayer Aktiengesellschaft, Fed. Rep. of Germany

[21] Appl. No.: 886,953

[22] Filed: Mar. 15, 1978

[30] Foreign Application Priority Data

Mar. 19, 1977 [DE] Fed. Rep. of Germany ....... 2712231

[51] Int. Cl.$^2$ ............................................. C08L 67/06
[52] U.S. Cl. .................................... 260/873; 260/887; 260/892
[58] Field of Search ............. 260/873, 47 UP, 47 XA, 260/887, 876 B

[56] References Cited

U.S. PATENT DOCUMENTS

| | | | |
|---|---|---|---|
| 3,873,641 | 3/1975 | Margotte et al. | 260/873 |
| 3,880,783 | 4/1975 | Serini et al. | 260/47 XA X |
| 3,947,524 | 3/1976 | Hozumi et al. | 260/873 |
| 3,954,905 | 5/1976 | Margotte et al. | 260/873 |
| 3,963,804 | 6/1976 | Yonemitsu et al. | 260/873 |
| 3,981,843 | 9/1976 | Yoshizaki et al. | 260/45.75 B |
| 3,988,389 | 10/1976 | Margotte et al. | 260/873 |
| 3,988,390 | 10/1976 | Prinz et al. | 260/873 |
| 4,028,433 | 7/1977 | Prinz et al. | 260/873 |

OTHER PUBLICATIONS

Christopher et al., *Polycarbonates* (Reinhold, 1962).
Schnell, *Chemistry and Physics of Polycarbonates* (Wiley, 1964).

*Primary Examiner*—Thomas DeBenedictis, Sr.
*Attorney, Agent, or Firm*—Connolly and Hutz

[57] ABSTRACT

A segment polymer comprising units derived from a linear living aromatic vinyl-diene block polymer anion and from an aromatic polycarbonate in which at least 50% of the polycarbonate consist of structural units represented by the following formula (I):

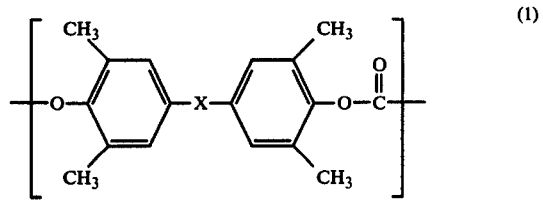

wherein X denotes $C_1$–$C_5$ alkylene or alkylidene, and which has thermoplastic and elastomeric properties.

9 Claims, No Drawings

SEGMENT POLYMERS DERIVED FROM AROMATIC VINYL-DIENE BLOCK POLYMER ANION AND AROMATIC POLYCARBONATE

Segment polymers, for example of the type ABA (A = aromatic polyvinyl, B = diene polymer block) have thermoelastic properties, i.e. they soften at temperatures starting from 60° C. and can be processed like thermoplastic materials at temperatures in the region of 180° C. On cooling to room temperature, these products have a rubbery elasticity. One disadvantage is that, owing to the aromatic polyvinyl blocks, softening and hence deterioration in the mechanical properties is already marked at 50° C. Attempts to use α-methyl styrene instead of styrene have not so far led to improved products. Although cross-linking of the ABA block polymers slightly improves their heat resistance, the processibility of these substances is deleteriously affected.

ABA block polymers are normally produced by coupling A/B block anions with suitable compounds, for example with esters, epoxides, ketones, halogen compounds, isocyanates, nitriles or aldehydes.

It is desirable to obtain segment polymers which have the properties of rubber but which still have sufficient mechanical strength at elevated temperatures. This is important not only for the use of the products at elevated temperatures but also for handling the products during their manufacture. The better the heat resistance, for example, the higher may be the temperature at which the products are released from the mould after extrusion, which means that the machines can be operated at higher throughput rates.

It has now been found that thermoplastic rubbers with improved heat resistance can be produced by reacting anions of linear aromatic vinyl-diene block polymers with aromatic polycarbonates in which at least 50% by weight of the, preferably, linear polycarbonate chains consist of structural units represented by the following formula (I):

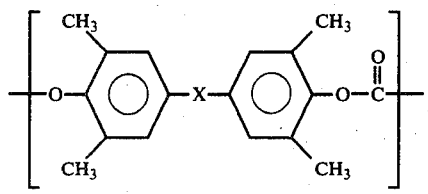

wherein

X denotes $C_1$-$C_5$ alkylene or alkylidene.

Linear aromatic polyvinyl-polydiene anions are suitable for the reaction with the polycarbonates.

The following are examples of such anions:
(A = aromatic polyvinyl, B = polydienyl group, C = aromatic polyvinyl different from A)

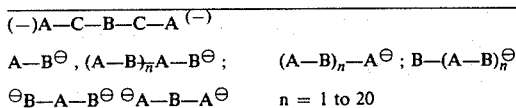

n = 1 to 20

The polymer anions described above are obtained by the usual methods of anionic polymerisation using alkali metals or alkaline earth metals or alkali metal alkylene in inert solvents (see L.J. Fetters in R.J. Ceresa, Block and Graft Copolymerisation, page 99).

When difunctional alkali metal compounds such as $RLi_2$ are used, linear dianions are obtained, which can also be used for this reaction.

The preparations of transition block polymers of the kind formed when B and A are polymerised simultaneously is also known. In such a polymerisation, a B block is first formed. Towards the end of B-polymerisation, a progressively increasing number of A molecules are built into this block until finally, when all the B monomers have been used up, only A monomers are polymerised to form pure A block. Numerous variations of this method have been described. These living anions can also be reacted with polycarbonates.

It is known that the polymerisation of butadiene with lithium butyl in apolar solvents leads predominently to 1,4- linkages. If products with a higher proportion of 1,2- linkages in the butadiene block are required, these can be obtained in known manner by the addition of polar inert compounds such as ethers, tertiary amines or the like.

In this way it is also possible to produce products containing blocks in which A and B are more or less statistically distributed. For example, a statistical A/B dianion may be prepared from a difunctional starter. Two homopolymer blocks A may then be added to the ends of this dianion by the addition of the monomer A to obtain products which may also be reacted with polycarbonates. A large number of other variations are known to those skilled in the art. A three block polymer can be prepared analogously by a three stage process.

According to Dutch Patent Specification No. 7,505,718, dianions of the type $^{(-)}$A—C—B—C—A$^{(-)}$ can be obtained by preparing A and C blocks of various aromatic vinyl compounds. These anions can also be reacted with polycarbonates. Block polymers containing blocks of various dienes may also be used.

The known inert hydrocarbons such as pentane, hexane, cyclohexane, benzene or toluene may be used as solvents for the preparation of the living anions. Mixtures of these solvents with each other or with lower boiling or higher boiling inert hydrocarbons may also be used.

The following are mentioned as examples of suitable aromatic vinyl compounds of the A type: styrene, α-methyl styrene, alkyl styrenes and vinyl naphthalene. The following are examples of suitable dienes of the B type: butadiene, isoprene, and piperylene. Before the reaction with the polycarbonates, the aromatic vinyl blocks A in the living anions usually have molecular weights of from 5,000-250,000 and diene blocks B have molecular weights of from 10,000 to 500,000. Anions in which the block A has a molecular weight in the range of from 10,000 to 50,000 and block B in the range of from 20,000 to 80,000 are preferred (molecular weight = average molecular weight measured by light scattering).

The polycarbonates used in these reactions are aromatic polycarbonates in which at least 50% by wt. of the, preferably, linear chains consist of structural units of formula (I), wherein X = $C_1$-$C_5$ alkylene or alkylidene. Polycarbonates suitable for use according to the invention are prepared in known manner from bisphenols of formula (2):

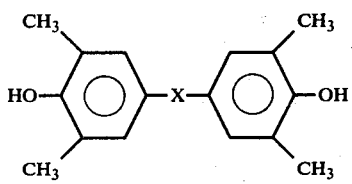

(2)

wherein X = $C_1$–$C_5$ alkylene or alkylidene.

If bisphenols which do not conform to formula (2) are used in addition, copolycarbonates are obtained, which contain only a proportion, but at least 50%, of units represented by formula (1).

Instead of such copolycarbonates, mixtures of polycarbonates and bisphenols not conforming to formula (2) may be used if the total proportion of units of formula (1) in the mixture is not less than 50%.

Polycarbonates which may be used according to the invention have been described in German Offenlegungsschriften Nos. 2,063,050; 1,570,703; 2,211,956; 2,211,957 and 2,248,817.

Polycarbonates which consist of least 75% of structural units of formula (1) are preferred. Polycarbonates consisting entirely of structural units according to formula (1) are particularly preferred.

The polycarbonate units of formula (1) may be based, for example, on the following bisphenols:
bis-(3,5-dimethyl-4-hydroxyphenyl)-methane
1,1-bis-(3,5-dimethyl-4-hydroxyphenyl)-ethane
1,1-bis-(3,5-dimethyl-4-hydroxyphenyl)-propane
2,2-bis-(3,5-dimethyl-4-hydroxyphenyl)-propane
2,2-bis-(3,5-dimethyl-4-hydroxyphenyl)-butane
2,4-bis-(3,5-dimethyl-4-hydroxyphenyl)-butane
2,4-bis-(3,5-dimethyl-4-hydroxyphenyl)-2-methylbutane
3,3-bis-(3,5-dimethyl-4-hydroxyphenyl)-pentane.

Among these bisphenols, 2,2-bis-(3,5-dimethyl-4-hydroxyphenyl)-propane is particularly preferred.

The following are examples of bisphenols not conforming to formula (2), which may be used for preparing the copolycarbonates or for preparing polycarbonates derived from bisphenols not conforming to formula (2):

hydroquinone; resorcinol; dihydroxydiphenyls; bis-(hydroxyphenyl)-alkanes; bis-(hydroxyphenyl)-cycloalkanes; bis-(hydroxyphenyl)-sulphides; bis-(hydroxyphenyl)-ethers; bis-(hydroxyphenyl)-ketones; bis-(hydroxyphenyl)-sulphoxides; bis-(hydroxyphenyl)-sulphones; α,α'-bis-(hydroxyphenyl)-diisopropylbenzenes; and derivatives of these compounds which are alkylated and/or halogenated in the nucleus.

These and other suitable aromatic dihydroxy compounds have been described in U.S. Pat. Nos. 3,028,365; 2,999,835; 3,148,172; 3,271,368; 2,991,273; 3,271,367; 3,780,078; 3,014,891; and 2,999,846 and in German Offenlegungsschrift No. 1,570,703.

The following are preferred: bis-(4-hydroxyphenyl)-sulphide; 2,2-bis-(4-hydroxyphenyl)-propane; 1,1-bis-(4-hydroxyphenyl)-cyclohexane; 2,2-bis-(3-methyl-4-hydroxyphenyl)-propane; 2,2-bis-(3,5-dichloro-4-hydroxyphenyl)-propane; 2,2-bis-(3,5-dibromo-4-hydroxyphenyl)-propane and α,α'-bis-(4-hydroxyphenyl)-p-diisopropylbenzene.

2,2-bis-(4-hydroxyphenyl)-propane is particularly preferred.

The polycarbonates may be branched by the incorporation of small quantities of polyhydroxyl compounds, e.g. 0.05 to 2.0 mole-% (based on the quantity of bisphenols used). Polycarbonates of this kind have been described, for example, in German Offenlegungsschriften Nos. 1,570,533, 2,116,974, and 2,113,347, British Patents Nos. 885,442 and 1,079,821 and U.S. Pat. No. 3,544,514. The following are some examples of suitable polyhydroxyl compounds: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenyl methane; 2,2-bis-[4,4-(4,4'-dihydroxydiphenyl)-cyclohexyl]-propane; 2,4-bis-(4-hydroxyphenyl-4-isopropyl)-phenol; 2,6-bis-(2'-hydroxy-5-methyl-benzyl)-4-methyl phenol; 2,4-dihydroxy benzoic acid; 2-(4-hydroxy-phenyl)-2-(2,4-dihydroxyphenyl)-propane; and 1,4-bis-(4',40''-dihydroxytriphenyl-methyl)-benzene.

The polycarbonates generally have molecular weights of from 10,000 to 200,000, preferably from 20,000 to 100,000, most preferably from 25,000 to 60,000 (measured by light scattering).

The reaction of the polymer anions with the polycarbonate takes place in a very short time if a solution of the polycarbonate in an inert solvent is added to the solution of the living polymer, but the procedure may also be reversed. It is preferable to use the same solvents as those required for the preparation of the polymer anions but different solvents may also be used, provided their reactivity with polymer anions is so slight as to be negligible compared with their reactivity with the polycarbonate. Examples of such solvents are the comparatively inert halogenated hydrocarbons. The reaction times are preferably between 0.5 to 360 minutes. It is preferred to employ from 10 to 120 minutes, and particularly from 30 to 60 minutes. The reaction time also depends on the viscosity of the solution, and the method used for mixing may also influence the properties of the product.

The reaction temperature employed for the reaction with the polycarbonate may be chosen within a wide range. If the temperatures are too low, the reaction is virtually limited by the increasing viscosity of the solution, whereas in the upper temperature range it is limited by the vapour pressure of the solvent. Temperatures within the range of from 20° to 80° C. are preferably employed, and for practical reasons it is particularly advantageous to employ the polymerisation temperature at which the block polymer was prepared.

The quantity of polycarbonate to be added depends on the desired properties of the end product. The molar ratio of block polymer anion to polycarbonate is preferably between 0.5:1 and 250:1. This ratio has a decisive influence on the properties of the products. At ratios above 250:1, the heat resistance mentioned earlier is just as low as in ordinary A/B polymers, i.e. those prepared with the known couplers. If the ratio is lowered, for example from 230:1 to 110:1 and then to 7:1, a progressive improvement in the heat resistance can be ascertained, for example by measuring the shore hardness at 100° C. The mechanical properties of the products improve accordingly. Ratios within the range of from 20:1 to 1:1 are preferred, and particularly preferred molar ratios of A/B anion:polycarbonate are from 15:1 to 3:1.

The segment polymers may be isolated by known methods, for example by a stripping process in which steam and polymer solution are simultaneously conducted into hot water. The polymer is then obtained in the form of lumps which can be worked up by known methods after separation of the water, e.g. by drying in a vacuum at elevated temperature or on band driers or in drying screws. The polymer may also be directly freed from solvent in evaporation screws.

The polymers may be modified by hydrogenation of the double bonds in the diene blocks and of the phenyl groups.

The segment polymers prepared according to the invention may also be modified by the addition of known polymers such as, for example, polystyrene, rubber-modified polystyrene or ethylene-vinyl-acetate copolymers. They may also be mixed with fillers such as silicic acids obtained from various sources, silicates and other minerals, saw dust, carbon black or glass fibres, or with dyes, pigments, heat stabilisers, oxidation stabilisers, UV stabilisers and other stabilisers, plasticisers, lubricants, mould-release agents and fire retarding additives such as, for example, halogenated organic compounds, metal oxides, metal salts or organic phosphates.

Softer mixtures may be obtained by the addition of oils. Aliphatic, naphthenic or aromatic oils may be used. Polyolefine oils and polydiolefine oils may also be added. Higher boiling aliphatic, araliphatic and aromatic esters may also be used.

The mixtures may be stabilised with the usual rubber stabilisers, for example of the type of alkylated mononuclear or polynuclear phenols or thioethers of alkylated phenols. Synergistically active compounds such as thio-bis-alkane acid esters and alkyl phenyl phosphites may also be added.

The polymers may be used for the manufacture of commercial rubber articles such as shoe soles, rubber tubing, seals, sheets and conveyor belts.

THE FOLLOWING EXAMPLES ILLUSTRATE THE INVENTION:

EXAMPLE 1

This Example illustrates the effect of the molar ratio of the S/B anion to the polycarbonate on the that resistance (Shore A hardness oat 100° C.). The polycarbonate used as coupling agent was a polymer prepared from tetramethyl bisphenol A(2,2-bis(3,5-dimethyl-4-hydroxyphenyl)propane) and phosgene and had a viscosity of $\eta_{rel} = 1.30$ determined on a solution containing 0.5 g of the polymer in 100 ml of methylene chloride (abbreviation = MPC). This corresponds to an average degree of polymerisation of 60.

91 g of purified, anhydrous styrene were added to 810 ml of anhydrous toluene and polymerisation was started by the addition of 7.1 mMol of n-butyl lithium. After a reaction time of 2 hours at 40° C., 143 g of anhydrous butadiene were added and polymerisation was continued at 45°–50° C. until completed. Two hours after the addition of butadiene, 1 g of MPC dissolved in 20 ml of anhydrous toluene was added and the solution was stirred for one hour at 20° C. The molar ratio of S B $^{74}$:MPC was 132:1. 0.5 phr of a phenolic stabilizer was then added and the polymer was precipitated by pouring the solution into ethanol. After drying under vacuum at 70° C., the product was moulded to form plates at 180° C. The mechanical properties are summarised in Table 1. S/B anion was reacted with 16 g of MPC dissolved in 100 ml of toluene by a method analogous to that described above and the product was worked up and tested as described above. The molar ratio was 8.2:1.

| $\frac{SB^{\ominus}}{MPC}$ | F | D | M 300/500% | H 23° | 70° | 100° | 150° | E 23°/75° | Str |
|---|---|---|---|---|---|---|---|---|---|
| 132 | 13.5 | 835 | 4.4  6.5 | 91 | 80 | 16 | 0 | 48/56 | 129 |
| 8.2 | 14.1 | 925 | 3.5  4.6 | 79 | 66 | 65 | 6 | 44/37 | 85 |

Abbreviations: F = strength (MPa), D = elongation at break (%), M = tension (MPa), H = Shore A hardness, E = recoil elasticity (%), Str = tear propagation resistance (N), (structure according to Pohle). The properties were determined on a standard ring I according to DIN 53 504.

The Shore A hardness at 100° C. is distinctly higher in the product prepared with a low molar ratio of $SB^{\theta}$/MPC.

EXAMPLE 2

This Example demonstrates the superiority of the products according to the invention over those produced with conventional coupling agents such as esters. As described in Example 1, styrene/butadiene diblock anions having the calculated molecular weights indicated in Table 2 were reacted with MPC ($\eta_{rel}$ 1.30) in the molar ratio indicated. For comparison, conventional thermoplastic rubbers were produced in analogous manner from diblock anions of the same molecular weight by reacting them with butyl acetate (molar ratio anion:ester = 2:1).

Table 2

| Comparison of coupler MPC with coupler butyl acetate (BA) | | | | | | | | | | | | |
|---|---|---|---|---|---|---|---|---|---|---|---|---|
| M . 10$^{-3}$ | | | $\frac{SB^{\ominus}}{MPC}$ | | | M | H | | | | E | |
| Sty | Bd | Coupler | | F | D | 300/500% | 23° | 70° | 100° | 150° | 23/75° | Str. |
| 15 | 15 | MPC | 7.2 | 14.3 | 650 | 7.9/11.5 | 95 | 86 | 58 | 0 | 45/35 | 205 |
| 15 | 15 | BA |  | 14.5 | 655 | 5.8/10.0 | 94 | 86 | 28 | 0 | 50/46 | 185 |
| 15 | 20 | MPC | 14.4 | 12.0 | 730 | 4.1/6.3 | 90 | 80 | 30 | 0 | 43/38 | 130 |
| 15 | 20 | MPC | 7.2 | 12.3 | 620 | 5.5/8.5 | 93 | 85 | 57 | 1 | 44/37 | 185 |
| 15 | 20 | BA |  | 13.8 | 720 | 4.4/6.9 | 92 | 79 | 13 | 0 | 42/36 | 178 |
| 20 | 30 | MPC | 14.4 | 18.0 | 885 | 3.2/5.2 | 91 | 83 | 49 | 8 | 43/36 | 130 |
| 20 | 30 | BA |  | 14.3 | 930 | 4.1/6.4 | 91 | 81 | 21 | 0 | 48/42 | 160 |
| 25 | 40 | MPC | 3.6 | 16.6 | 960 | 4.0/5.9 | 95 | 89 | 68 | 5 | 47/38 | 150 |

A comparison of the Shore hardnesses at 100° C. shows up the superiority of polymers which are coupled with MPC.

EXAMPLE 3

A thermoplastic rubber with a Shore hardness A in the region of 70 was produced by reacting a diblock anion with MPC in a molar ratio of 7.2:1. The S/B molecular weights in the diblock were 13,000/36.000. The advantage of the new types of rubber can be seen from a comparison with various products having the same Shore hardness (Table 3).

Table 3

Comparison of MPC polymers with S/B commercial products of similar hardness.

| Type | F | D | M 300/500% | H 23° | 70° | 100° | 120° | 150° | E 23/70° | Str |
|---|---|---|---|---|---|---|---|---|---|---|
| Example 3 | 11.2 | 975 | 2.0/3.0 | 65 | 55 | 45 | 23 | 1 | 60/70 | 73 |
| Cariflex TR 4122 | 6.7 | 990 | 2.4/3.7 | 74 | 53 | 8 | 0 | 0 | 37/34 | 72 |
| Solprene 416 | 7.8 | 630 | 2.5/4.4 | 66 | 42 | 9 | 0 | 0 | 67/52 | 50 |
| Tufprene X | 9.2 | 865 | 1.7/2.7 | 65 | 29 | 4 | 0 | 0 | 46/40 | 40 |
| Europrene SOL T 163 | 6.8 | 615 | 2.7/4.4 | 71 | 30 | 4 | 0 | 0 | 66/53 | 50 |

Cariflex 4122 is a linear segment polymer of the type S-B-S with a polybutadiene content of 60% (Shell AG) and with an oil content of 30%.
Solprene 416 is a segment polymer of the teleblock type (branched) having an iodine number of 69.4 (Phillips Petroleum).
Tufprene X is a styrene-butadiene segment polymer with an oil content of 34% (Asahi).
Europrene SOL T 163 is a branched segment polymer manufactured by Anic, having an iodine number of 69.1.

EXAMPLE 4

With suitable choice of the S/B block molecular weights and the anion/coupler ratio, products of great hardness and tear resistance combined with good elasticity can be produced.

| $M \cdot 10^{-3}$ S/B | $\frac{SB^{\ominus}}{MPC}$ | F | D | M 300/500 | H 23° | 70° | 100° | 150° | E 23/70° | Str. |
|---|---|---|---|---|---|---|---|---|---|---|
| 15/30 | 3.5 | 17.7 | 885 | 3.2/5.5 | 83 | 73 | 48 | 2 | 52/43 | 110 |
| 15/30 | 1.7 | 12.9 | 860 | 3.2/5.1 | 79 | 68 | 54 | 2 | 49/41 | 110 |
| 20/30 | 1.0 | 14.4 | 760 | 7.6/10.1 | 95 | 89 | 78 | 24 | 45/39 | 235 |

EXAMPLE 5

91 g of styrene were dissolved in 950 ml of anhydrous toluene. Polymerisation was started by the addition of 7.2 mMol of n-butyl lithium and continued for one hour at a temperature of 40° C. 180 g of anhydrous isoprene were then added and polymerisation was continued for a further two hours at 45° C. 32 g of MPC (see Example 1) dissolved in 150 ml of anhydrous toluene were then added to the styrene/isoprene diblock anion. The mixture was stirred for one hour at room temperature and the polymer was precipitated with ethanol after stabilisation with 1.0 phr of 2.6-di-tert.butyl-4-methyl phenol. When the product had been dried under vacuum at 70° C., it was pressed at 150° C. to form a plate. The mechanical values (DIN 53 504) determined on this plate were as follows: F = 10.2, D = 920, M = 2.3/3.5, H (23°, 70°, 100°, 120°, 150°) = 69, 56, 47, 27, 0; E(23/70°) = 49/25; Str. = 101 (for abbreviations see Example 1).

EXAMPLE 6

A solution of a mixture of 6 g of MPC and 6 g of PC (bisphenol A-polycarbonate, Makrolon 2600) was added to 250 g of a styrene/butadiene diblock anion having molecular weights of 20,000/20,000 dissolved in toluene. When the product had been worked up, it was found to have the following mechanical properties: F = 12.8, D = 650, M = 6.8/10.4, H(23°, 70°, 100°) = 96, 94, 75; Str. = 315.

EXAMPLE 7

A living polymer having the composition $S_1$-B-$S_2{}^{\ominus}Li^{\oplus}$ was prepared in toluene by adding the calculated quantity of lithium butyl to the quantity of styrene which was to provide the block $S_1$ and the mixture was left to react for about one hour at 50° C. The quantity of butadiene corresponding to block B was then added and lastly, after a further two hours, the quantity of styrene corresponding to block $S_2$ was added. The calculated molecular weight of blocks $S_1$ and $S_2$ was 15,000 in each case and that of the polybutadiene block B was 30,000. 20 phr of MPC ($\eta_{rel}$ = 1.30) dissolved in toluene were added after a further hour to the resulting living polymer of the formula already indicated, and the components were mixed for one hour. When the polymer had been worked up, it was pressed at 180° C. to form plates from which the mechanical data were obtained.

| Molecular weights × $10^{-3}$ | | | F | D | M | H (Shore A) | | | |
|---|---|---|---|---|---|---|---|---|---|
| $S_1$ | B | $S_2$ | (MPa) | (%) | 300/500% | 23° | 70° | 100° | 150° |
| 15 | 30 | 15 | 18.2 | 650 | 8.2/11.1 | 95 | 93 | 90 | 12 |

We claim:

1. Segment polymers obtainable by the reaction of linear living aromatic vinyl-diene block polymer anions with an aromatic polycarbonate of which at least 50% by weight
consists of structural units represented by the following formula (I):

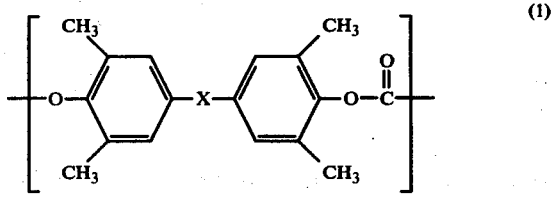

wherein X denotes $C_1$–$C_5$ alkylene or alkylidene.

2. Segment polymers according to claim 1, characterised in that the aromatic vinyl block has a molecular weight of from 5,000 to 250,000 and the diene block has a molecular weight of from 10,000 to 500,000.

3. Segment polymers according to claim 1, characterised in that the aromatic vinyl block has a molecular weight of from 10,000 to 50,000 and the diene block has a molecular weight of from 20,000 to 80,000.

4. Segment polymers according to claim 1, characterised in that the molecular weights of the polycarbonates are from 10,000 to 200,000.

5. Segment polymers according to claim 1, characterised in that the molecular weights of the polycarbonates are from 15,000 to 100,000.

6. Segment polymers according to claim 1, characterised in that the molar ratio of block polymer anion to polycarbonate is from 0.5:1 to 250:1.

7. Segment polymers according to claim 1, characterised in that the molar ratio of block polymer anion to polycarbonate is from 20:1 to 1:1.

8. A process for the preparation of segment polymers according to claim 1 characterised in that living linear aromatic vinyl-diene block polymer anions are reacted in an inert solvent with an aromatic polycarbonate of which at least 50% by weight consist of structural units of the following formula (I):

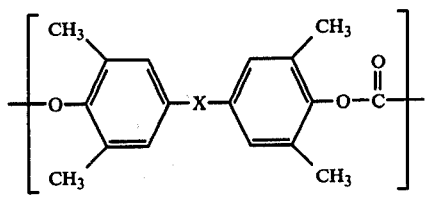

wherein X denotes $C_1$–$C_5$ alkylene or alkylidene.

9. A process according to claim 8, characterised in that the reaction is carried out at temperatures of from 20° to 80° C.

* * * * *